US006447904B1

(12) United States Patent
Davis et al.

(10) Patent No.: US 6,447,904 B1
(45) **Date of Patent: *Sep. 10, 2002**

(54) FUSER MEMBER HAVING COMPOSITE MATERIAL INCLUDING POLYALKYL SILOXANE

(75) Inventors: Stephen V. Davis, Rochester; Jiann H. Chen, Fairport; Robert A. Lancaster, Hilton, all of NY (US)

(73) Assignee: NexPress Solutions LLC, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/212,997

(22) Filed: Dec. 16, 1998

(51) Int. Cl.[7] ............................ D02G 3/00; B32B 9/06; B25F 5/02

(52) U.S. Cl. ....................... 428/379; 428/375; 428/372; 428/389; 428/391; 428/447; 428/450; 492/56; 492/59

(58) Field of Search ................................ 524/786, 785, 524/431, 430, 588; 428/375, 372, 379, 391, 447, 457, 450, 471, 389; 492/56, 59

(56) References Cited

U.S. PATENT DOCUMENTS

| | | | | | |
|---|---|---|---|---|---|
| 3,731,358 | A | | 5/1973 | Artl | |
| 4,074,001 | A | | 2/1978 | Imai et al. | |
| 4,659,621 | A | | 4/1987 | Finn et al. | |
| 5,035,950 | A | | 7/1991 | Del Rosario | |
| 5,166,031 | A | | 11/1992 | Badesha et al. | |
| 5,269,740 | A | | 12/1993 | Fitzgerald et al. | |
| 5,292,562 | A | | 3/1994 | Fitzgerald et al. | |
| 5,292,606 | A | | 3/1994 | Fitzgerald | |
| 5,336,539 | A | | 8/1994 | Fitzgerald | |
| 5,466,533 | A | * | 11/1995 | Fitzgerald et al. | 428/447 |
| 5,474,821 | A | | 12/1995 | Kass | |
| 5,480,724 | A | | 1/1996 | Fitzgerald et al. | |
| 5,480,725 | A | * | 1/1996 | Fitzgerald et al. | 428/447 |
| 5,534,347 | A | | 7/1996 | Chen et al. | |
| 5,547,759 | A | * | 8/1996 | Chen et al. | 428/421 |
| 5,548,720 | A | | 8/1996 | Fujii | |
| 5,582,917 | A | * | 12/1996 | Chen et al. | 428/421 |
| 5,587,245 | A | * | 12/1996 | Visser et al. | 428/447 |
| 5,654,052 | A | | 8/1997 | Visser et al. | |
| 5,709,949 | A | * | 1/1998 | Chen et al. | 428/421 |
| 5,753,361 | A | | 5/1998 | Visser | |
| 5,824,416 | A | * | 10/1998 | Chen et al. | 428/422 |
| 5,906,881 | A | * | 5/1999 | Chen et al. | 428/141 |
| 5,960,245 | A | * | 9/1999 | Chen et al. | 399/333 |
| 6,020,038 | A | * | 2/2000 | Chen et al. | 428/36.9 |

FOREIGN PATENT DOCUMENTS

| | | |
|---|---|---|
| EP | 0 417 814 | 6/1994 |

OTHER PUBLICATIONS

Emerson & Cuming, STYCAST–4952 Material Data Sheet.*

Emerson & Cuming, STYCAST–4952 Technical Data Sheet.*

* cited by examiner

*Primary Examiner*—Cynthia H. Kelly
*Assistant Examiner*—J. M. Gray
(74) *Attorney, Agent, or Firm*—Lawrence P. Kessler

(57) ABSTRACT

A fuser member having a support metallic core and a layer of material formed over the metallic core, the layer includes composite material, including a high molecular weight reactive polyfunctional poly($C_{(1-6)}$ alkyl)siloxane polymer; a cross-linked poly(dialkylsiloxane) incorporating an oxide, wherein the poly(dialkylsiloxane) has a weight average molecular weight before crosslinking of about 5,000 to 80,000; and a silane crosslinking agent.

20 Claims, 2 Drawing Sheets

FUSER MEMBER HAVING COMPOSITE MATERIAL INCLUDING POLYALKYL SILOXANE

FIELD OF THE INVENTION

The present invention relates to the field of fuser members useful in electrophotographic copying.

BACKGROUND OF THE INVENTION

A widely used method for affixing toner materials to a receiver sheet is by the application of high temperature and pressure in the fusing subsystem of a photocopying machine. A common configuration for a fusing subsystem is to place a pair of cylindrical rollers in contact. The roller that contacts the side of the receiver sheet carrying the unfixed or unfused toner is known as the fuser roller. The other roller is known as the pressure roller. The area of contact is known as the nip.

A toner receiver sheet containing the unfixed or unfused toner is passed through the nip. A soft coating on one or both of the rollers allows the nip to increase in size relative to the nip which would have been formed between two hard rollers and allows the nip to conform to the receiver sheet, improving the fusing quality. Typically, one or both of the rollers are heated, either through application of heat from the interior of the roller or through external heating. A load is applied to one or both rollers in order to generate the higher pressures that are necessary for good fixing or fusing of the toner to the receiver sheet.

The application of high temperature and pressure as the receiver sheet passes through the nip causes the toner material to flow to some degree, increasing its contact area with the receiver sheet. If the cohesive strength of the toner and the adhesion of the toner to the receiver sheet is greater than the adhesion strength of the toner to the fuser roller, complete fusing occurs. However, in certain cases, the cohesive strength of the toner or the adhesion strength of the toner to the receiver is less than that of the toner to the fuser roller. When this occurs, some toner will remain on the roller surface after the receiver sheet has passed through the nip, giving rise to a phenomenon known as offset. Offset can also occur on the pressure roller.

Offset is undesirable because it can result in transfer of the toner to non-image areas of succeeding copies and can lead to more rapid contamination of all machine parts in contact with the fusing rollers and to increased machine maintenance requirements. It can also lead to receiver (paper) jams as the toner-roller adhesion causes the receiver sheet to follow the surface of the roller rather than being released to the post-nip paper path.

It is common in some machines to apply release oil externally to the roller in the machine as it is being used. The release oil is typically poly(dimethylsiloxane) (PDMS) oil. PDMS oil does an excellent job in its role as release agent; however, there are associated disadvantages.

The release agent can be spread to other parts of the machine, causing contamination. Further, streaks may appear in the image as a result of imperfect spreading of the release agent across the roller surface. Therefore, it is desirable to improve the release performance of the roller materials in order to be able to minimize the amount of release agent that must be applied to the roller.

The release agent's compatibility with PDMS-based roller materials result in swelling of the rollers. This swelling cannot be easily compensated for, since it is generally non-uniform. Paper passing over the rollers can wick away some of the release oil within the paper path, resulting in a differential availability of the release oil to roller areas within and outside the paper path. This causes differential swell of the roller inside and outside the paper path so that a "step pattern" is formed in the roller. This can cause problems when different size papers are used and can lead to increased wear and decreased roller life as described in U.S. Pat. No. 5,753,361. This wear can also lead to an uneven pressure distribution between the two rollers of the fusing assembly resulting in poor print quality as described in U.S. Pat. No. 5,035,950 and as is well known in the art. Another associated problem is the tendency of a silicone layer to soften as it swells with the polydimethylsiloxane release fluids and its subsequent debonding as described in U.S. Pat. No. 5,166,031. Here the suggested solution to the problems of the silicone fuser member coating was to develop fluoroelastomer analogs to replace the silicone. However, the toner's tendency to offset is sacrificed.

Use of a soft fuser roller and a harder pressure roller have been shown to facilitate release of the toned receiver from the fuser roller. Low surface energy materials such as fluorine-containing coatings or silicone rubbers have been used as fuser roller coatings. An example of a low surface energy material is described in U.S. Pat. No. 3,731,358 which discloses the use of a poly(dimethylsiloxane) as a coating for a fuser roller. This patent also discloses coating the roller with silicone oil after it has been used for a period of time in order to restore release properties.

In European Patent Application 0 417 814 A, there is disclosed a fuser roller having a PDMS outer layer which has filler that contains absorbed silicone oil. It also discloses a fuser roller having a low viscosity PDMS oil incorporated therein in a comparative example. Poor offset performance was noted.

Addition of a low viscosity silicone oil into the roller material during formulation has also been suggested to improve the release properties of the roller in U.S. Pat. No. 4,074,001.

U.S. Pat. No. 5,654,052 describes a fuser member having as its outermost layer, a composite material comprising: a crosslinked, oxide filled poly(dimethylsiloxane) which contains and a non-crosslinked, non-reactive poly (dimethylsiloxane) oil having a viscosity of at least 25,000 CPS. The disadvantage of this being the poly (dimethylsiloxane) oil is not bound to the polymer resulting in poor toughness and wear as well as the oil being able to leach out of the fuser member. Thus limiting the amount of oil which can be incorporated oil to about 1%.

There continues to be a need for improved fuser and pressure rollers with improved fusing performance, e.g. increased toner release without reducing the toughness or drastically affecting the wear properties.

SUMMARY OF THE INVENTION

It is an object of the present invention to provide an improved fuser member with improved toner release.

In accordance with the present invention there is provided a fuser member having a support metallic core and a layer of material formed over the metallic core, the layer including composite material, comprising:

(a) a reactive crosslinkable poly(dialkylsiloxane);

(b) a cross-linked poly(dialkylsiloxane) incorporating an oxide, wherein the poly(dialkylsiloxane) has a weight average molecular weight before crosslinking of about 5,000 to 80,000; and (c) one or more silane crosslinking agents.

An advantage of the present invention is that incorporating a high molecular weight reactive polyfunctional poly(C $_{(1-6)}$ alkyl)siloxane polymer causes an improvement in toner release of the fusing member.

Another advantage of the current invention is that it successfully increases the oil swell resulting in the advantages listed above without sacrificing the toughness and without significantly affecting the wear properties.

Another advantage of the current invention is that it permits incorporation of higher amounts of poly (dimethylsiloxane) than were nonreactive poly (dimethylsiloxane) oil to be incorporated.

DETAILED DESCRIPTION OF THE INVENTION

Figure 1:
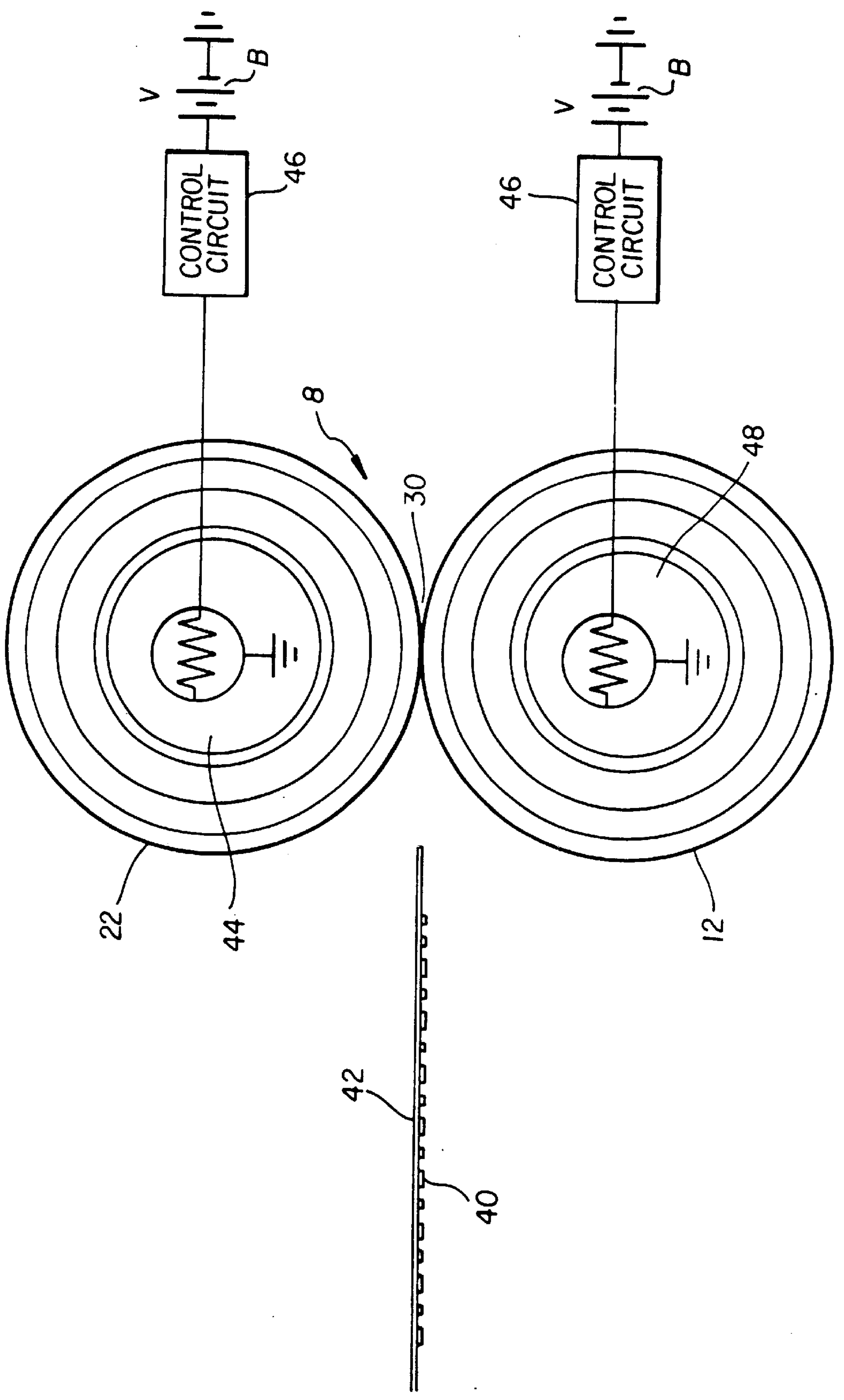
FIG. 1 is a cross-sectional view of a fusing assembly including a fuser roller and a pressure roller.

Turning first to FIG. 1, there is shown a fusing assembly 8 which includes a fusing member, shown as fusing roller 12 and another fusing member, shown as a pressure roller 22. The fuser roller 12 roller heated either internally with a heating lamp 48 controlled by control circuit 46 driven by a power supply shown as battery B. The pressure roller 22 may or may not be likewise heated by either internally with a heating lamp 44 controlled by another control circuit 46. In place of using an internal heating element the exterior surface of fuser roller 12 and pressure roller 22 can be heated. The fuser roller 12 and pressure roller 22 come together under pressure to form a nip 30. The receiver sheet 42 with unfused toner 40 pass through the nip to fuse the toner 40 to the receiver sheet 42.

Figure 2:
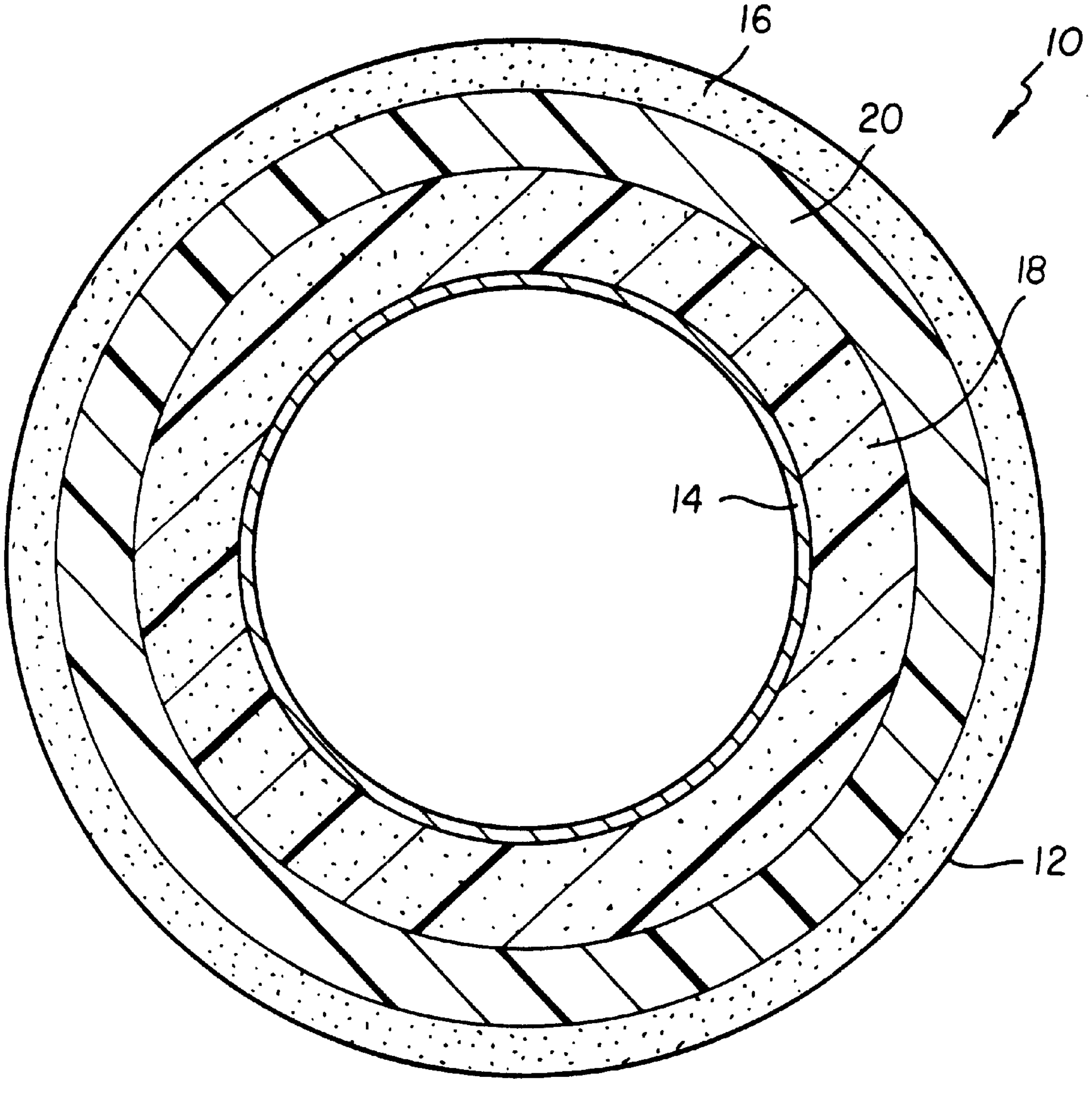
FIG. 2 is a cross-sectional view of the fusing roller of FIG. 1.

In FIG. 2, there is shown a fusing member 10 which is in the form of a roller such as fuser roller 12. Also, the pressure roller 22 can have the same or similar configuration as shown in FIG. 2. The fusing roller 12 includes a metallic core 14 which is preferably formed of an aluminum shaft which is connected to a gudgeon (not shown) which has a thermal conductivity lower than the metallic core 14 disposed over the metallic core 14 roller an outer layer 16. The outer layer 16 includes a silicone T-resin and other materials that will be discussed later. As shown it may be preferable to include intermediate layers between the metallic core 14 and the outer layer 16. In the embodiment shown there is a cushion layer 18 formed on the metallic core 14 and another intermediate barrier layer 20 formed between the outer layer 16 and the cushion layer 18.

In practice the cushion layer 18 and the intermediate layer 20 may be omitted. When present both layers would be formed of a temperature resistant material. In the case of the fuser member being a fusing roller (12 in FIG. 1) it can be desirable for the cushion layer 18 to be thermally conductive such a metal oxide filled silicone elastomer. In the case of the fuser member being a pressure roller (22 in FIG. 1) it may be desirable for the cushion layer 18 to be of low thermally conductivity such a silicon oxide filled silicone elastomer.

In either application the other intermediate layer 20 can be either to control surface finished or to act as an adhesion promotion or oil barrier layer. The fuser member of the present invention can be either the fuser roller, as defined above, or the pressure roller also as defined above.

The outer layer 16 of the fuser member 10 of the invention includes a cross-linked poly(dialkylsiloxane) having at least one oxide. The fillers are an oxide or mixture of oxides. Typical oxides include metal oxides such as aluminum oxide, iron oxide, tin oxide, zinc oxide, copper oxide and nickel oxide. Silica (silicon oxide) can also be used.

Examples of suitable materials for a cross-linked poly (dialkylsiloxane) incorporating an oxide, wherein the poly (dialkylsiloxane) has a weight average molecular weight before crosslinking of about 5,000 to 80,000 of the outer layer are filled condensation-cross-linked PDMS elastomers disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,548,720 (tin oxide filler), U.S. Pat. No. 5,336,539, (nickel oxide).

Silanol-terminated poly(dialkylsiloxane) polymers and methods of their preparation are well known. They are readily commercially available, e.g., from Huls America, Inc., (United Chemical) 80 Centennial Ave., Piscataway, N.J., U.S.A., and having the repeat unit structure:

Structure 1

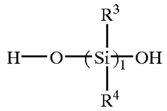

For purpose of the present invention 1 is an integer such that the Structure (I) polymer has a weight average molecular weight of from 5,000 to 80,000. $R^3$ and $R^4$ are independently alkyl groups such as methyl, ethyl, propyl, butyl, pentyl, or hexyl. If the molecular weight were below 5,000, the final cross-linked poly(dialkylsiloxane) would have a high crosslink density that would make the material too hard and brittle, and not resilient enough to serve practically in a base cushion layer. If the molecular weight were above 80,000, the final cross-linked poly(dialkylsiloxane) would be too unstable under conditions of high temperature and cyclic stress (i.e., there would be too much creep and change in hardness over time). A preferred silane crosslinking agent is polyethylsilicate.

The poly(dialkylsiloxane) polymers can be cross-linked with multifunctional silanes. The multifunctional silanes that can serve as crosslinking agents for the Structure (I) polymers are well known for this purpose. Each of such silanes comprises a silicon atom bonded to at least three groups that are functional to condense with the hydroxy end groups of the Structure (I) polymers to thereby create siloxane crosslinks through the silicon atom of the silane. The functional groups of the silanes can be, for example, acyloxy (R—COO—), alkenoxy ($CH_2$=C(R)O—), alkoxy (R—O—), dialkylamino ($R_2$ N—), or alkyliminoxy ($R_2$ C=N—O—) groups, wherein R represents an alkyl moiety. Some specific examples of suitable multifunctional silane crosslinking agents are methyltrimethoxysi lane, tetraethoxysilane, methyltripropenoxysilane, methyltriacetoxysilane, propyltrimethoxysilane, phenyltrimethoxysilane, methyltris(butanone oxime)silane, and methyltris(diethylamino)silane.

In the case where alkoxy functional groups are employed, the condensation crosslinking reaction is carried out with the aid of a catalyst, such as, for example, a titanate, chloride, oxide, or carboxylic acid salt of zinc, tin, iron, or lead. Some specific examples of suitable catalysts are zinc octoate, dibutyltin diacetate, ferric chloride, and lead dioxide.

The primary cross-linked poly(dialkylsiloxane) material used for the Examples and Comparative Examples is a STYCAST® 4952, sold by Grace Specialty Polymers, Massachusetts. STYCAST® 4952 is composed of a network-forming polymer that is a silanol-terminated (α-ω-hydroxy-) poly(dimethylsiloxane). The number of repeat units is such that the silanol-terminated poly(dimethylsiloxane) (α-ω-dihydroxypolydimethyl siloxane has a weight average molecular weight of from 5,000 to 80,000. This composition includes the filler. The filler is between 55–70 wt % aluminum oxide and 5–15 wt % iron oxide particulate fillers. Polyethylsilicate (condensed tetraethylorthosilicate) is present as the crosslinking agent.

The second component of the outermost layer is a high molecular weight polyfunctional poly ($C_{(1-6)}$alkyl)siloxane polymer. The high molecular weight reactive polyfunctional poly ($C_{(1-6)}$alkyl)siloxane polymer has repeating units of the formula, $$R^1{}_aSiO_{(4-a)/2};$$

where $R^1$ is $C_{(1-6)}$alkyl and a is 0–3.

Specific examples of useful crosslinking catalysts for this polymer are dibutyltin diacetate, tin octoate, zinc octoate, dibutyltin dichloride, dibutyltin dibutoxide, ferric chloride, lead dioxide, or mixtures of catalysts such as CAT50® (sold by Grace Specialty Polymers, Massachusetts). CAT50® is believed to be a mixture of dibutyltin dibutoxide and dibutyltin dichloride diluted with butanol.

Further, the high molecular weight reactive polyfunctional poly($C_{(1-6)}$ alkyl)siloxane polymer is a liquid blend comprising about 60 to 80 weight percent of a difunctional polydi($C_{(1-6)}$ alkyl) siloxane having a number average molecular weight of about 150,000, and 20 to 40 weight percent of a polytri($C_{(1-6)}$ alkyl)silyl silicate resin having monofunctional and tetrafunctional repeating units in an average ratio of between 0.8 and 1 to 1, and having a number average molecular weight of about 2,200.

For the preferred embodiment, the various components of the composite material can have the following weight percentages:

(a) 10–60 wt % α-ω-hydroxy- poly(dialkyl siloxane) having a weight average molecular weight of from 5,000 to 80,000

(b) 55–85 wt % oxide fillers, especially the combination of 55–70 wt % aluminum oxide and 5–15 wt % iron oxide;

(c) 0.5–5 wt % crosslinking agent;

(d)<30 wt % high molecular weight reactive polyfunctional poly($C_{(1-6)}$ alkyl)siloxane polymer; and (e) 0.05–2 wt % catalyst.

To form the outer layer 16 of a fuser member in accordance with the invention, a slight excess of the stoichiometric amount of multifunctional silane to form crosslinks with all the hydroxy end groups, and the appropriate amount of filler are thoroughly mixed on a three-roll mill. The high molecular weight reactive polyfunctional poly($C_{(1-6)}$ alkyl) siloxane polymer is also incorporated at this time. If a catalyst is necessary, it is then added to the mix with thorough stirring. The mix is then degassed. The mix can then be injected into a mold surrounding the fuser member, e.g. roll, core to mold the material onto the core. The core remains in the mold for a time sufficient for some crosslinking to occur (e.g., 4 hours). The roll is then removed from the mold and heated to accelerate the remaining crosslinking. Alternately the mix can be applied to the fuser member by methods other than molding as would be known to one skilled in the art.

It is currently preferred to apply the outer layer 16 over the metallic core 14 which has been conversion coated and primed with metal alkoxide primer in accordance with commonly assigned U.S. Pat. No. 5,474,821. If the outer layer 16 roller coated over another coating layer, one or more methods of layer-to-layer adhesion improvement, such as corona discharge treatment of the other coating layer's surface, may be applied prior to application of the material of this invention. Various methods of layer-to-layer adhesion improvement are well known to one skilled in the art.

The outer layer 16 can be used as an outer coating layer over an oil barrier layer. An oil-barrier layer can be obtained by coating an underlying silicone elastomer, coated directly or indirectly on a cylindrical core, with a composition formed by compounding a mixture comprising a fluorocarbon copolymer, a fluorocarbon-curing agent, a reactive polyfunctional poly($C_{(1-6)}$ alkyl)phenylsiloxane polymer, one or more fillers and an accelerator for promoting crosslinking between the curing agent and the fluorocarbon copolymer as described in commonly assigned U.S. Pat. No. 5,534,347. Other candidates for oil barrier layer include most heat stable materials having no PDMS oil swell.

The thickness of the outer layer 16 and any other layers present, e.g. cushion layers 18 and the like, can provide the desired resilience to the fuser roller 12, and the outer layer 16 can flex to conform to that resilience. The thickness of the cushion layer 18 and other layers can be chosen with consideration of the requirements of the intended application. Usually, the outer layer 16 would be thinner than the cushion layer 18. For example, cushion layer 18 thickness in the range from 0.5 to 6.0 mm have been found to be appropriate for various applications.

The release fluid is continuously coated over the surface of the fuser roller 12 in contact with the toner image. The fuser roller 12 can be used with polydimethylsiloxane or functionalized polydimethylsiloxane release oils at normally used application rates or at reduced application rates, generally but not limited to about 0.5 mg/copy to 10 mg/copy (the copy is 8.5 by 11 inch 20 pound bond paper).

The rollers produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member. Such contact is maintained at a temperature and pressure sufficient to fuse the toner to the receiver.

EXAMPLES

The following examples are presented for a further understanding of the invention.

Example 1

1 Kg STYCAST® 4952 (a cross-linked poly (dimethylsiloxane) incorporating an oxide) was blended with 250 g high molecular weight reactive polyfunctional poly($C_{(1-6)}$ alkyl)siloxane polymer (SFR-100 obtained from GE silicones) on a 3 roll mill. CAT50® catalyst (a dibutyltindiacetate) was added at the rate of one part of catalyst to 400 parts by weight STYCAST® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 2

1 kg STYCAST® 4952 (a cross-linked poly (dimethylsiloxane) incorporating an oxide) was blended with 111 g SFR-100 on a 3 roll mill. CAT50® catalyst (a dibutyltindiacetate) was added at the rate of one part of catalyst to 400 parts by weight STYCAST® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 3

1 kg STYCAST® 4952 (a cross-linked poly (dimethylsiloxane) incorporating an oxide) was blended with 50 g SFR-100 on a 3 roll mill. CAT50® catalyst (a dibutyltindiacetate) was added at the rate of one part of catalyst to 400 parts by weight STYCAST® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 1

100 parts STYCAST® 4952 was blended with CAT50® catalyst at the rate of one part of catalyst to 400 parts by weight SYCAST® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 2

1 kg STYCAST® 4952 (a cross-linked poly (dimethylsiloxane) incorporating an oxide) was blended with 52 g PS340 (linear hydroxy terminated poly (dimethylsiloxane) with a number average molecular weight of 700 obtained from United Chemical) and 25 g Tetraethoxysiiane obtained from (Aldrich Chemical Co.) on a 3 roll mill. CAT50® catalyst (a dibutyltindiacetate) was added at the rate of one part of catalyst to 440 parts by weight STYCAST® 4952. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 3

1 kg STYCAST® 4952 (a cross-linked poly (dimethylsiloxane) incorporating an oxide) was blended with 52 g PS340 (linear hydroxy terminated poly (dimethylsiloxane) with a number average molecular weight of 700 obtained from United Chemical) and 75 g Tetraethoxysilane obtained from (Aldrich Chemical Co.) on a 3 roll mill. CAT50® catalyst (a dibutyltindiacetate) was added at the rate of one part of catalyst to 440 parts by weight STYCAST® 4952. The mixture was degassed and molded in the shape of a 90 mil×6 inch×6 inch slab. The slab was air cured 12 hours at 25° C. then demolded. The slab was the cured Material Testing Swell Oil swell was measured by immersing a weighed sample in 1000 cts Dow Corning DC200 polydimethylsiloxane for 7 days at 175° C. and calculating the weight Wear The wear rate test of molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and running the tests at about 350° F. 480 Cycles were accumulated with a 1 kg load on a 9/16 inch wide sample. The depth of the wear track was then measured on a Federal 2000 Surfanalyzer using a chisel tip at 25 mm/min, Oil wear The wear test above was performed on a sample which had be soaked in 1000 cts polydimethylsiloxane oil at 175° C. for 7 days.

Toner Release Test

The test samples are employed to evaluate the toner offset and release force characteristics of the outermost layer 16. Two samples are cut approximately 1-inch square of each example. One of these squares is left untreated by release agent (the dry sample). To the surface of the other sample is applied in unmeasured amount of 1000 cts polydimethysiloxane (the oil sample).

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused polysytrene acrylate SB75 toner is placed in contact with a sample on a bed heated to 175° C., and a pressure roller set for 80 psi is locked in place over the laminate to form a nip. After 20 minutes the roller is released from the-laminate.

The extent of offset for each sample is determined by microscopic examination of the sample surface following delamination. The following numerical evaluation, corresponding to the amount of toner remaining on the surface, is employed.

1 0% offset

1–2 0–20% offset

2–3 20–50% offset

3–4 50–90% offset

4–5 90–100% offset

Qualitative assessment of the force required for delamination of the paper from the sample is as follows:

1 low release force 2 moderate release force 3 high release force

Mechanical Properties

Toughness were measure on an Instron Tensile Tester using ASTM D412. The test was run using a 100 lb load cell and 50.8 mn/min crosshead speed. The specimen gauge length was 16.51 mm.

The results are shown in the following table:

| Sample | swell (%) | Toughness (Mpa) | Wear (mils) | Oil Wear (mils) | Dry Release/ Offset | Oil Release/ Offset |
|---|---|---|---|---|---|---|
| E1 | 20.10 | 3.951 | 5.2 | 9.8 | 1/1.5 | 1/1 |
| E2 | 13.02 | 3.744 | 4.6 | 8.6 | 1/1.5 | 1/1 |
| E3 | 10.38 | 3.365 | 4.3 | 7.5 | 1/1.5 | 1/1 |
| CE1 | 6.72 | 3.674 | 5.0 | 7.9 | 1/1.5 | 1/1.5 |

-continued

| Sample | swell (%) | Toughness (Mpa) | Wear (mils) | Oil Wear (mils) | Dry Release/ Offset | Oil Release/ Offset |
|---|---|---|---|---|---|---|
| CE2 | 3.98 | 0.818 | 6.3 | 7.3 | 1/1.5 | 1/1 |
| CE3 | 4.92 | 0.998 | 4.4 | | 1/1.5 | 1/1 |

Advantages

The examples and comparative example demonstrate that incorporation of a small amounts of high molecular weight reactive polyfunctional poly($C_{(1-6)}$ alkyl)siloxane polymer increases the oil swell of the material thus increasing the toner release properties without detrimentally affecting the wear resistance or the mechanical properties of the materials. Further it is demonstrated that superior toughness was obtained.

The invention has been described with particular reference to preferred embodiments thereof but it will be understood that variations and modifications can be effected within the spirit and scope of the invention.

PARTS LIST

8 fusing assembly
10 fusing member
12 fuser roller
14 metallic core
16 outer layer
18 cushion layer
20 intermediate barrier layer
22 pressure roller
30 nip
40 unfused toner
42 receiver sheet
44 heating lamp
46 circuit
48 heating lamp

What is claimed is:

1. A fuser member having a support metallic core and a highly oil-swellable composite outer layer formed over the metallic core, said composite outer layer being formed from a mixture consisting essentially of:

(a) a high molecular weight reactive crosslinkable poly ($C_{(1-6)}$ alkyl)siloxane polymer;

(b) a crosslinking catalyst; and (c) a formulation containing a crosslinked poly (dialkylsiloxane) having a weight average molecular weight of about 5,000 to 80,000, an oxide filler, and a silane crosslinking agent.

2. The fuser member of claim 1 wherein the cross-linked poly(dialkylsiloxane) includes poly(dimethylsiloxane).

3. The fuser member according to claim 1, wherein the crosslinked poly(dialkylsiloxane) includes an (α-ω-hydroxy-) poly(dialkylsiloxane) having a viscosity before cross-linking in the range of 1000–3000 cts, measured at 25° C. and having the general structure

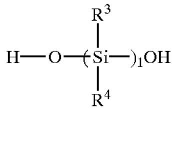

where 1 is an integer, $R^3$ and $R^4$ are independently alkyl groups selected from the group consisting of methyl, ethyl, propyl, butyl, pentyl, and hexyl.

4. The fuser member according to claim 1 wherein the silane crosslinking agent includes a polyethyl silicate crosslinking agent.

5. The fuser member according to claim 1 wherein the oxide filler includes aluminum oxide and iron oxide.

6. The fuser member of claim 1 wherein said crosslinking catalyst is selected from the group consisting of dibutyltin dibutoxide, dibutyltin dichloride, and mixtures thereof.

7. The fuser member of claim 1 wherein said crosslinking catalyst is selected from among a titanate, a chloride, an oxide, or a carboxylic acid salt of zinc, tin, iron, or lead.

8. The fuser member of claim 7 wherein said catalyst is selected from among zinc octoate, dibutyltin diacetate, ferric chloride, or lead dioxide.

9. A fuser member having a support metallic core and a highly oil-swellable composite outer layer formed over the metallic core, said composite outer layer being formed from a mixture consisting essentially of:

(a) a high molecular weight reactive crosslinkable poly ($C_{(1-6)}$ siloxane polymer which is a liquid blend containing about 60 to 80 weight percent of a difunctional polydi($C_{(1-6)}$ alkyl)siloxane having a number average molecular weight of about 150,000, and 20 to 40 weight percent of a polytri($C_{(1-6)}$alkyl)silyl silicate resin having monofunctional and tetrafunctional repeating units in an average ratio of between 0.8 and 1 to 1, and having a number average molecular weight of about 2,200;

(b) a crosslinking catalyst; and (c) a formulation containing a crosslinked poly (dialkylsiloxane) having a weight average molecular weight of about 5,000 to 80,000, an oxide filler, and a silane crosslinking agent.

10. The fuser member of claim 9 wherein the cross-liked poly(dialkylsiloxane) includes poly(dimenthylsiloxane).

11. The fuser member according to claim 9 wherein the high molecular weight reactive crosslinkable poly($C_{(1-6)}$ alkyl)siloxane polymer is present in the composite outer layer in an amount less than 50 weight percent.

12. The fuser member according to claim 9 wherein the silane crosslinking agent is present in an amount of from about 0.8 to 20 parts per 100 parts of crosslinked poly (dialkylsiloxane).

13. The fuser member according to claim 9 wherein the fusing member is a fuser roller or a pressure roller.

14. The fuser member according to claim 9 further including an oil barrier layer disposed between the support metallic core and the composite outer layer.

15. The fuser member according to claim 14 further including a cushion layer disposed between the oil barrier layer and the support metallic core.

16. The fuser member according to claim 9 further including a cushion layer disposed between the support metallic core and the composite outer layer.

17. The fuser member of claim 9 wherein said crosslinking catalyst is selected from among a titanate, a chloride, an oxide, or a carboxylic acid salt of zinc, tin, iron, or lead.

18. A fuser member having a support metallic core and a highly oil-swellable composite outer layer formed over the metallic core, said composite outer layer being formed from a mixture consisting essentially of:

(a) a high molecular weight reactive crosslinkable poly ($C_{(1-6)}$ alkyl)siloxane polymer;

(b) a crosslinking catalyst; and (c) a formulation containing a crosslinked poly (dialkylsiloxane) having a weight average molecular weight of about 5,000 to 80,000, an oxide filler, and a silane crosslinking agent, wherein the fuser member has a swelling of greater than 10 percent by weight of the original composite outer layer in 1,000 cts oil at 175° C. for seven days in conjunction with a toughness greater than 3 Mpa.

19. The fuser member of claim 18 wherein the crosslinked poly(dialkylsiloxane) includes poly (dimethylsiloxane).

20. The fuser member of claim 18 wherein said crosslinking catalyst is selected from among a titanate, a chloride, an oxide, or a carboxylic acid salt of zinc, tin, iron, or lead.

* * * * *